United States Patent Office 2,799,560
Patented July 16, 1957

2,799,560

CONVERSION OF SULPHUR DIOXIDE TO SULPHUR TRIOXIDE

Phineas Davies, Norton-on-Tees, England, assignor to Imperial Chemical Industries Limited, a corporation of Great Britain No Drawing. Application September 7, 1954, Serial No. 454,606

Claims priority, application Great Britain October 2, 1953

11 Claims. (Cl. 23—176)

This invention relates to the oxidation of sulphur dioxide to sulphur trioxide.

It has already been proposed to produce a catalyst comprising vanadium oxides and a potassium compound on silica gel by slowly adding a potassium silicate solution to dilute sulphuric acid, thereby causing a silica sol to be formed, mixing this sol with a solution of a vanadium compound, co-precipitating silica and a hydrated vanadium oxide by the slow addition of ammonia, and finally drying, calcining and grinding the product. In this mode of producing the catalyst, the potassium content is derived from potassium silicate. Catalysts of this type have been used in the oxidation of sulphur dioxide to sulphur trioxide. In particular, it has been proposed to use catalysts having a potassium:vanadium molar ratio, expressed as $K_2O:V_2O_5$, of 4:1 in this reaction and to operate at temperatures of 440° C. and above. It has also been proposed that catalysts of the type disclosed should contain 7% to 12% by weight of vanadium, expressed as $V_2O_5$.

The catalysts already proposed for the oxidation of sulphur dioxide to sulphur trioxide are active at temperatures of 430° C. and above. As will be described later in this specification, a considerable advantage would be obtained by using a catalyst already possessing a marked activity at substantially lower temperatures.

We have now found that catalysts possessing a higher potassium:vanadium ratio, expressed as $K_2O:V_2O_5$, than those hitherto employed, are highly active at temperatures lower than those hitherto employed for the oxidation of sulphur dioxide to sulphur trioxide.

According to the present invention, there is provided a process for the oxidation of sulphur dioxide to sulphur trioxide, which comprises contacting sulphur dioxide and a gas containing free oxygen with a catalyst comprising oxides of vanadium, potassium and silicon, the potassium:vanadium ratio, expressed as the molar ratio $K_2O:V_2O_5$, being from 4.5:1 to 6.0:1, and the reaction being initiated at a temperature within the range of 380° to 400° C.

It should be noted that the oxides of vanadium, potassium and silicon, which are essential constituents of the catalysts employed in the present process, may be present in combination; for example, the potassium oxide may be present in combination with silica as potassium silicate, and with vanadium pentoxide as potassium vanadate.

Using catalysts previously disclosed in the art at operating temperatures of 380° and 400° C., we have found that the conversion of sulphur dioxide to sulphur trioxide is of the order of 11.0 and 17.5%, using a mixture of 6% by volume $SO_2$ in air, and contacting this with the catalyst at a space velocity of 2,500 litres per litre of catalyst-filled space per hour. In contrast, catalysts of the present invention, employed under the same conditions, give conversions of 36% at 380° C. and 47.5% at 400° C.

It is a feature of the present invention that a higher potassium:vanadium ratio should be employed if an initial operating temperature of 380° C. is to be used than if operation is to be initiated at 400° C. The table below gives optimum potassium:vanadium ratios for initial operation at 380° C., 390° C. and 400° C.

| Temperature | Optimum K:V ratio (Expressed as $K_2O:V_2O_5$ (molar)) |
|---|---|
| 380° C | 5.4:1 |
| 390° C | 5.0:1 |
| 400° C | 4.5:1 |

In contrast to the above figures, it should be noted that for an operating temperature of 420° C., the optimum potassium:vanadium ratio is 3.3:1.

The catalysts for use in the process of the present invention are preferably produced by co-precipitation. For example, a potassium silicate solution may be added to dilute sulphuric acid with constant stirring, whereby a silica sol is formed; the silica sol may be mixed with a soluble vanadium compound, and silica and an insoluble vanadium compound may be co-precipitated by the addition of ammonium hydroxide. The product may be dried and calcined.

In a catalyst preparation of the type described above, the following features are desirable or necessary:

(a) It is necessary during the formation of the sol to keep the pH of the solution at not greater than 4. An increase of the pH above this value makes the sol unstable, and leads to gel formation.

(b) Desirable vanadium compounds for use in the production of the catalysts employed are vanadyl chloride, vanadyl oxalate, ammonium vanadate, or, preferably, vanadyl sulphate.

(c) It is desirable to avoid a filtration or decantation step in the catalyst production process. Filtration or decantation results in a potassium loss in the filtrate or supernatant solution, and therefore renders difficult an exact control of the potassium content of the final catalyst, which content, it must be remembered, is of great importance. Thus, it is desirable to dry and ignite the whole of the product formed in the precipitation step; by a suitable control of solution concentrations, a gel product, free from supernatant liquid, may be obtained.

In the production of catalysts for use in the process of the present invention, it is convenient to have a vanadium content, expressed as $V_2O_5$, of 6 to 7.5% by weight. Furthermore, if desired, the catalyst may contain an inert filler, such as kieselguhr. This may be present in an amount of up to 50% of the total weight of the catalyst. The introduction of an inert filler such as kieselguhr gives rise to a catalyst having a larger volume, per unit weight of vanadium, expressed as $V_2O_5$, than a catalyst containing no filler. When using an inert filler, the vanadium content expressed as percent by weight of $V_2O_5$, may be lower than that given above. The activity of the catalyst is not substantially decreased by the use of a filler. Thus, for a reactor of the same size, a smaller weight of vanadium compound will have to be used if a filler is present than if a filler is absent. This, in turn, gives rise to an appreciable economic gain.

It is now intended to discuss the oxidation of sulphur dioxide to sulphur trioxide, and to indicate the marked benefits obtained by operating according to the process of the present invention.

The reaction:

$$2SO_2 + O_2 \rightarrow 2SO_3$$ 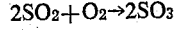

is exothermic. Thus, in a converter used for the direct oxidation of sulphur dioxide to sulphur trioxide, there is a temperature increase along the reactor. It is customary for a sulphur dioxide converter to contain two, three or four catalyst beds in series. After leaving each bed, the gas mixture is cooled by heat exchange with a cooler gas stream before being introduced to the next bed.

To illustrate a typical sulphur dioxide oxidation converter already employed in the art, one containing three beds of catalyst will be described. It is usual to carry out as much conversion as possible in the first bed. The gas leaving this bed will, however, still be far from equilibrium conditions, and, in consequence, equilibrium considerations are not important for this bed. In fact, the limit on the amount of conversion that is allowed to take place is governed by the permissible temperature rise across the bed. To high a temperature will cause a loss of catalyst activity, possibly because of a loss of vanadium by vaporisation. The lowest temperature at which catalysts already known in the art possess an activity sufficiently high to be practically useful is 420° C., and, in consequence, the first catalyst bed is conveniently run at an inlet temperature of 420° C. and an exit temperature of 560° C.

In the process of the present invention, a catalyst is employed which possesses a sufficiently high activity for an inlet temperature of the first catalyst bed of 380° C. to be employed. As will be seen, the advantages of this are extremely marked. The amount of conversion taking place in the first stage is approximately proportional to the temperature increase through the bed. With the catalysts of the prior art, the temperature increase, as stated above, is of the order of 140° C., whereas in the process of the present invention, since an inlet temperature of 380° C. and an exit temperature of 560° C. may be employed, the temperature increase is of the order of 180° C. Thus, a marked increase in conversion can be achieved. Alternatively, using the same temperature increase, i. e., 140° C., and in consequence the same conversion, the exit temperature from the catalyst bed will be 520° C. instead of 560° C. This lower exit temperature will tend to lead to a decreased rate of catalyst deterioration.

In the second bed, the inlet and exit temperatures using a catalyst as previously disclosed in the art are 430° C. and 500° C. By using the catalysts of the present invention, the temperature of this second bed can be maintained at 380° to 450° C. If the first and third beds are operated at an inlet temperature of 300° C., this results in a simplicity of operation. Furthermore, by working in the lower temperature range, the catalyst life is prolonged.

In the third bed, the inlet gases already possess a high sulphur trioxide content. It is the intention in this third bed to bring the conversion to the highest possible value. When using the catalysts known in the art, the third bed is conveniently operated at an inlet temperature of 420° C. and an exit temperature of 450° C. An inlet temperature of 420° C. is the minimum at which, with the known catalysts, there is a reasonable velocity of reaction. Considering now the equilibrium conversions of sulphur dioxide in:

(a) A gas obtained from the burning of sulphur in air, the gas containing 9.6% by volume $SO_2$ and 11.3% by volume $O_2$, (b) A gas obtained from the burning of pyrites in air, the gas containing 6.5% by volume $SO_2$ and 14.4% by volume $O_2$, we have the following results:

| Temperature, ° C. | Percent $SO_2$ converted using gas described in (a) | Percent $SO_2$ converted using gas described in (b) |
| --- | --- | --- |
| 380 | 99.5 | 99.6 |
| 410 | 99.0 | 99.2 |
| 430 | 98.4 | 98.7 |
| 450 | 97.6 | 98.1 |

Since, in this third zone, there is relatively little reaction, despite the presence of twice as much catalyst as in the previous beds, the temperature rise through the bed is only 30° C., i. e., the exit temperature from the third bed is 450° C. The final conversion of sulphur dioxide observed, when using the gas described in (a) above, is 96.7%; i. e., within 1% of the theoretical maximum conversion of 97.6%. In contrast to the inlet temperature of 420° C. employed using catalysts of the prior art, an inlet temperature as low as 380° C. may be employed with catalysts of the present invention. The temperature increase will be the same as that previously observed, i. e., 30° C. Thus, if the inlet temperature of the third bed is 380° C., the exit temperature will be 410° C. The maximum (i. e., equilibrium) conversion is 99.0%, as will be seen from the table above. Assuming that, as before, an approach to within 1% of equilbruim is achieved, it will be seen that the final sulphur dioxide conversion will be of the order of 98%. This figure should be compared with that of 96.7% which can be achieved with the catalysts of the prior art, i. e., in the present process, the amount of sulphur dioxide unconverted is only 2% in contrast to 3.3% when operating with the less active catalyst disclosed in the prior art. There is consequent increase in efficiency in the operation of the plant, and a corresponding reduction in the problem of effluent disposal.

It is an important feature of the present invention that the catalyst composition may be varied throughout each of the beds described above, in a manner such that the catalyst composition in each part of the zone is adjusted to give the maximum conversion of sulphur dioxide to sulphur trioxide at the temperature existing in the said part of the zone. This variation in composition gives particularly efficacious results in the third catalyst bed described above. This will now be discussed in greater detail, and the advantages made evident.

The first section of the third catalyst bed preferably contains a catalyst having a potassium:vanadium ratio (expressed as the molar ratio $K_2O:V_2O_5$) of 5.4:1. The inlet temperature in this first section will be 380° C. In the second section of the third catalyst bed, the potassium:vanadium ratio will be lower than before, and will preferably be of the order of 5.0:1. This is desirable, because, as already indicated, this is the optimum ratio for a temperature of 390° C., and by the time this second section is reached, the operating temperature will be 390° to 400° C. Similarly, in the third section of the third catalyst bed, the operating temperature will be 400° to 410° C., and in consequence it is desirable for the catalyst in this section to have a potassium:vanadium ratio of 4.5:1. By operating in this way, each of the catalysts is operated at close to its maximum activity, and, in consequence, there is either a considerable economy in the size of the catalyst bed, or, alternatively, a large increase in the throughput of reactants can be achieved.

The process of the present invention is applicable to any industrial gas comprising sulphur dioxide in air. For example, gases which may be used include gas from the cement-anhydrite process, which contains 6.5% by volume $SO_2$ and 7.5% by volume $O_2$ gas from pyrite burners, which contains 6.5 to 9.5% by volume $SO_2$ and 14.4 to 11.4% by volume $O_2$, and gas from sulphur burners, which contains 9.6% by volume $SO_2$ and 11.3% by volume air.

EXAMPLE 1

A range of catalysts was obtained by the following technique. 310 grams of 66° Tw. potassium silicate diluted with 120 mls. water were added to 330 mls. of 10% sulphuric acid till pH 4 was reached. Varying amounts of vanadyl sulphate solution were then added, to give the desired $K_2O:V_2O_5$ molar ratios, and ammonia (S. G. 0.88) was then added to bring the pH to 6.0. The product was dried at 120° C., ground to pass a 60 B. S. S. sieve, and calcined at 420° C. in a laboratory fluidised bed calcination unit. The calcined powder was then pelletted into the form of 3/16 inch cylinders.

The converter comprised three vertical tubes, each having an internal diameter of 1.25 inches and a length of 18 inches. The tubes were each packed to a depth of 8 inches with aluminium pellets. A volume of 20 mls. of catalyst was then introduced into each tube; this occupied a depth of approximately 1 inch. Finally, the upper 9 inches of each tube were packed with aluminium pellets. It should be noted that the centre of each tube was occupied by a thermocouple sheath, ⅛ inch in diameter. The three tubes were heated in an electrically heated block furnace.

A mixture comprising 6% by volume of sulphur dioxide in air was fed to the tubes. The air was dried with sulphuric acid prior to being mixed with the sulphur dioxide.

The tubes in the block furnace were run at the desired temperature until steady conditions were achieved. An indication of steady operating conditions was provided by a constant composition of the gases leaving the tubes.

The gases leaving the converter tubes, after the removal of sulphur trioxide, were analysed for residual sulphur dioxide. The analysis was carried out by contacting the gas with an iodine-starch solution; the end-point was indicated by the disappearance of the characteristic blue coloration.

After satisfactory results had been obtained at the temperature employed, the temperature was raised, conditions allowed to become constant, and further results then obtained. In this way, sulphur dioxide conversion/temperature relationships were obtained for a range of catalyst compositions. The results are presented in Table I below; in each case, the temperature is that of the inlet end of the catalyst bed and the gas rate for the $SO_2$/air mixture was 50 litres per hour, i. e., a space velocity of 2500 litres per hour per litre of catalyst-filled space. The conversion figures represent the percentage of sulphur dioxide converted to sulphur trioxide.

Table I

| $K_2O:V_2O_5$ Molar ratio | Conversion, Percent | | | | | | | | | |
|---|---|---|---|---|---|---|---|---|---|---|
| | 380 | 390 | 400 | 410 | 420 | 430 | 440 | 450 | 460 | 470 |
| 2.65:1 | 9.0 | 12.3 | 17.0 | 25.0 | 37.0 | 53.7 | 68.2 | 76.5 | 81.5 | 84.0 |
| 3.05:1 | 17.0 | 26.0 | 40.0 | 57.0 | 73.5 | 84.0 | 89.0 | 91.0 | 92.0 | 92.7 |
| 3.72:1 | 19.5 | 30.0 | 43.5 | 59.5 | 73.5 | 82.0 | 85.7 | 88.5 | 90.5 | 91.8 |
| 5.37:1 | 36.5 | 41.2 | 48.0 | 56.0 | 64.0 | 70.5 | 75.0 | 78.3 | 80.7 | 83.0 |
| 6.7:1 | 28.0 | 33.7 | 40.5 | 48.0 | 55.0 | 62.0 | 68.0 | 73.0 | 76.5 | 79.5 |

From these figures, for each temperature a graph was plotted to show the conversion as a function of $K_2O:V_2O_5$ molar ratio. From these graphs, the optimum $K_2O:V_2O_5$ molar ratios to give maximum conversions were determined for temperatures in the range of 380° to 470° C. The figures are given in Table II below.

Table II

| Temperature, ° C. | $K_2O:V_2O_5$ molar ratio for maximum conversion | Maximum conversion obtained, Percent |
|---|---|---|
| 380 | 5.4 | 36 |
| 390 | 5.0 | 41 |
| 400 | 4.5 | 50 |
| 410 | 3.9 | 60 |
| 420 | 3.3 | 76 |
| 430 | 3.1 | 85 |
| 440 | 3.06 | 89 |
| 450 | 3.04 | 91 |
| 460 | 3.03 | 93 |
| 470 | 3.02 | 94 |

EXAMPLE 2

412 grams of 66° Tw. potassium silicate diluted with 162 mls. of water were added to 440 mls. of 10% sulphuric acid till pH 4 was reached. To the clear sol 70.4 mls. of vanadyl sulphate solution containing 207.7 grams $V_2O_5$ per litre were added with thorough mixing. To the product was added 100 grams of kieselguhr. The mixture was then gelled by the addition of ammonia (S. G. 0.88). The product was dried at 120° C., ground to pass a 60 B. S. S. sieve and calcined at 420° C. in a laboratory fluidised bed calcination unit. The calcined powder was then pelletted into the form of 3/16 inch cylinders.

The catalyst had the following composition by weight:

| | Percent |
|---|---|
| $K_2O$ | 14.8 |
| $V_2O_5$ | 4.7 |
| $SO_3$ | 18.1 |
| $SiO_2$ | 53.2 |

The bulk of the residual 9.2% by weight was water. It will be seen that the $K_2O:V_2O_5$ molar ratio was 6:1.

A similar catalyst was prepared without the incorporation of kieselguhr. The catalysts were then tested in the oxidation of sulphur dioxide under conditions as described in Example 1. The following results were obtained:

Table III

| Temperature, ° C. | Conversion, using kieselguhr-containing catalyst | Conversion, using kieselguhr-free catalyst |
|---|---|---|
| 380 | 26 | 24 |
| 400 | 43 | 40 |
| 420 | 60 | 56 |
| 440 | 73 | 70 |
| 460 | 80 | 78 |

It will be seen that the catalyst containing kieselguhr behaves in a very similar manner to the catalyst free from kieselguhr.

Although in this example the kieselguhr was added immediately prior to the precipitation stage, it should be noted that very similar results are obtained by adding the kieselguhr to the sulphuric acid used in the first stage of the preparation.

I claim:

1. A process for the oxidation of sulphur dioxide to sulphur trioxide which comprises contacting sulphur dioxide and a gas containing free oxygen with a catalyst comprising oxides of vanadium, potassium and silicon and produced by adding potassium silicate solution to dilute sulphuric acid whereby a silica sol is formed, mixing the silica sol with a soluble vanadium compound, and co-precipitating silica and an insoluble vanadium compound by the addition of ammonium hydroxide, the potassium:vanadium ratio, expressed as the molar ratio $K_2O:V_2O_5$, being from 4.5:1 to 6.0:1, and the reaction being initiated at a temperature within the range of 380° to 400° C.

2. A process as defined in claim 1 in which the reaction is initiated at a temperature of 380° C. and the potassium:vanadium ratio, expressed as the molar ratio $K_2O:V_2O_5$, is in the region of 5.4:1.

3. A process as defined in claim 1 in which the reaction is initiated at a temperature of 390° C. and the potassium:vanadium ratio, expressed as the molar ratio $K_2O:V_2O_5$, is in the region of 5.0:1.

4. A process as defined in claim 1 in which the reaction is initiated at a temperature of 400° C. and the potassium:vanadium ratio, expressed as the molar ratio $K_2O:V_2O_5$, is in the region of 4.5:1.

5. A process as defined in claim 1 in which the pH during the addition of the potassium silicate solution to the dilute sulphuric acid does not exceed 4, and in which the silica sol is mixed with a soluble vanadium compound selected from the group consisting of vanadyl sulphate, vanadyl chloride, vanadyl oxlate and ammonium vanadate.

6. A process as defined in claim 1 in which the vanadium content of the catalyst, expressed as $V_2O_5$, is from 6 to 7.5% by weight.

7. A process as defined in claim 1 in which the catalyst contains an inert filler, the amount of which does not exceed 50% of the total catalyst weight.

8. A process as defined in claim 1 in which the catalyst contains kieselguhr, the amount of which does not exceed 50% of the total catalyst weight.

9. A process as defined in claim 1 in which the oxidation is carried out in three successive zones, the inlet temperature of each zone being of the order of 380° C. and the exit temperatures decreasing progressively from the first zone to the third.

10. A process as defined in claim 1 in which the oxidation is carried out in three successive zones, the inlet temperature of each zone being of the order of 380° C. and the exit temperatures decreasing progressively from the first zone to the third, the exit temperature of the third reaction zone being of the order of 410° C.

11. A process as defined in claim 1 in which the oxidation is carried out in three successive zones, the inlet temperature of each zone being of the order of 380° C. and the exit temperatures decreasing progressively from the first zone to the third, and in which the catalyst composition is varied in each zone in such a manner that the catalyst composition in each part of the zone is adjusted to give the maximum conversion of sulphur dioxide to sulphur trioxide at the temperature existing in the said part of each zone.

References Cited in the file of this patent

UNITED STATES PATENTS

| | | |
|---|---|---|
| 1,880,678 | Beardsley et al. | Oct. 4, 1932 |
| 2,027,316 | Johnson | Jan. 7, 1936 |
| 2,046,166 | Jenks | June 30, 1936 |

FOREIGN PATENTS

| | | |
|---|---|---|
| 14,870 | Australia | Aug. 6, 1929 |
| 296,048 | Great Britain | Jan. 11, 1929 |
| 348,669 | Great Britain | May 16, 1931 |

OTHER REFERENCES

Chem. Abstracts, vol. 34, 8185(7), Vanadium Oxide Catalyst.

Chem. Abstracts, vol. 35, 3396(9), Vanadium Oxide Catalyst.